(No Model.)
D. YOUNG.
FLOAT VALVE.
No. 267,736. Patented Nov. 21, 1882.
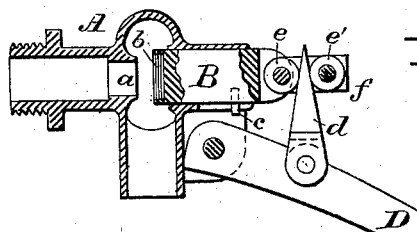
Fig. 1.
Fig. 2.
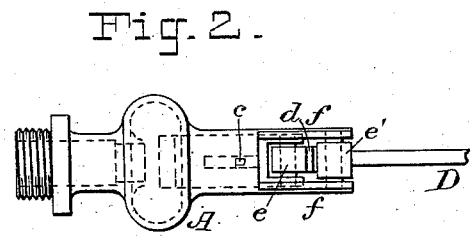
Fig. 3.
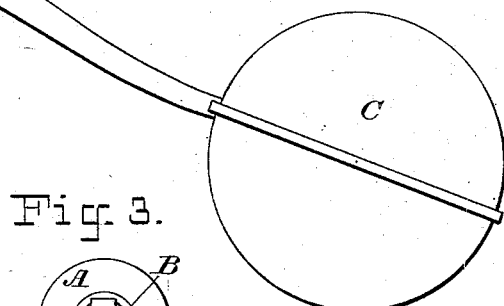
Fig. 4.
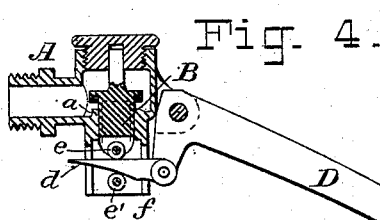
Fig. 5.
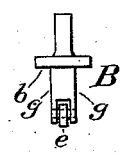
Fig. 6.
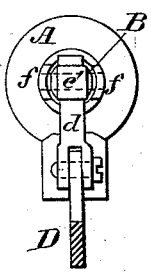
WITNESSES:
E. R. Bolton
Geo. Bainton
INVENTOR:
David Young
By his Attorneys,
Burke, Fraser Connett

UNITED STATES PATENT OFFICE.

DAVID YOUNG, OF LONDON, ENGLAND.

FLOAT-VALVE.

SPECIFICATION forming part of Letters Patent No. 267,736, dated November 21, 1882.

Application filed December 13, 1881. (No model.) Patented in England June 18, 1880, No. 2,466; in France December 17, 1880, No. 140,198; in Belgium December 20, 1880, No. 53,368; in Italy December 31, 1881, No. 13,569, and in Austria January 14, 1882.

*To all whom it may concern:*

Be it known that I, DAVID YOUNG, a subject of the Queen of Great Britain, residing in London, England, have invented an Improved Float-Valve, of which the following is a specification.

My improved valve is shown in the accompanying drawings, wherein Figure 1 is a side elevation, partly in vertical mid-section. Fig. 2 is a fragmentary plan. Fig 3 is an end elevation. Fig. 4 is a sectional side elevation of a modification. Fig. 5 is a front elevation of the plunger-valve removed, and Fig. 6 is an end view or inverted plan of said plunger-valve.

Let A designate the valve box or casing; $a$, the fixed seat therein; B, a plunger or valve proper, arranged to slide longitudinally in said casing toward or from the seat; $b$, a packing of leather or rubber confined in a recess in the plunger; C, the usual float or air-ball, and D the lever bearing said float. To the lever D a wedge, $d$, is pivoted, and projects between an anti-friction roller, $e$, on the end of the plunger B and a second roller, $e'$, borne by extension arms or brackets $ff$, forming part of the casing A.

In Figs. 1 to 3 the valve-plunger B intervenes between the seat $a$ and the roller $e'$, and the lever D is arranged beneath the valve, so as to thrust the wedge $d$ between the two rollers $e\ e'$ upon the rising of the float C, thereby forcing the plunger B against its seat and shutting off the flow of water. This form of my valve thus closes against the pressure of the water by the buoyant power of the float. The plunger B is prevented from turning by a pin, $c$, projecting from it and working in a longitudinal slot in the casing A.

In Fig. 4 is shown a valve opening against the pressure of the liquid. The plunger B extends through the seat and moves vertically. When it is lifted the liquid escapes through spaces formed by flattening the opposite sides $g\ g$ of the plunger. The lever D is an elbow-lever, and the wedge enters horizontally. When the water-level is low the weight of the float C and lever D thrusts the wedge $d$ between the rollers $e\ e'$ and lifts the plunger B. As the float rises the wedge $d$ is gradually withdrawn, and the water-pressure above the plunger forces it to its seat and stops the flow.

The rollers $e\ e'$ are not essential, their use being only to decrease the friction, as the wedge might be thrust directly between the end of the plunger B and some stationary re-enforce on the casing A; or, in lieu of rollers, anti-friction balls may be used, held in cupped sockets. In any case the rollers or balls are to be regarded as parts of the plunger and fixed re-enforcement.

In lieu of a wedge, other well-known mechanical equivalents thereof may be used. For example, an inclined plane might be fixed between the arms $ff$, and a suitably-shaped sliding piece be connected to the lever in place of the wedge; or a block having an inclined slot in it may be substituted for the wedge, the plunger being bisected at its end to permit the block to slide within it, a cross-pin being fitted into the plunger and passing through the inclined slot, and the valve-casing being provided with a cap or other device to guide the block in its movement; but I prefer the wedge as being more easily applied and more efficient.

I claim as my invention—

1. The combination of a valve-casing containing a seat, a valve or plunger arranged to work against said seat, a float and its lever, and a wedge or its described equivalent, connected to said lever, and adapted to be thrust by a movement thereof between said valve or plunger and a stationary part, and thereby to cause a movement of said valve or plunger proportioned to the movement of said float, substantially as set forth.

2. The combination of casing A, seat $a$, valve or plunger B, wedge or its described equivalent $d$, lever D, and float C, substantially as set forth.

3. The combination of casing A, seat $a$, plunger B, abutment $e'$, float C, lever D, and wedge $d$, arranged to enter between said plunger and abutment upon the rising of the float, and thereby force the plunger against the seat, substantially as set forth.

In witness whereof I have hereunto signed my name in the presence of two subscribing witnesses.

DAVID YOUNG.

Witnesses:
E. R. YOUNG,
H. YOUNG.